Sept. 29, 1964 C. W. GERHARDT 3,150,522
APPARATUS FOR MEASURING CORROSION RATES
Filed Aug. 29, 1961 2 Sheets-Sheet 1
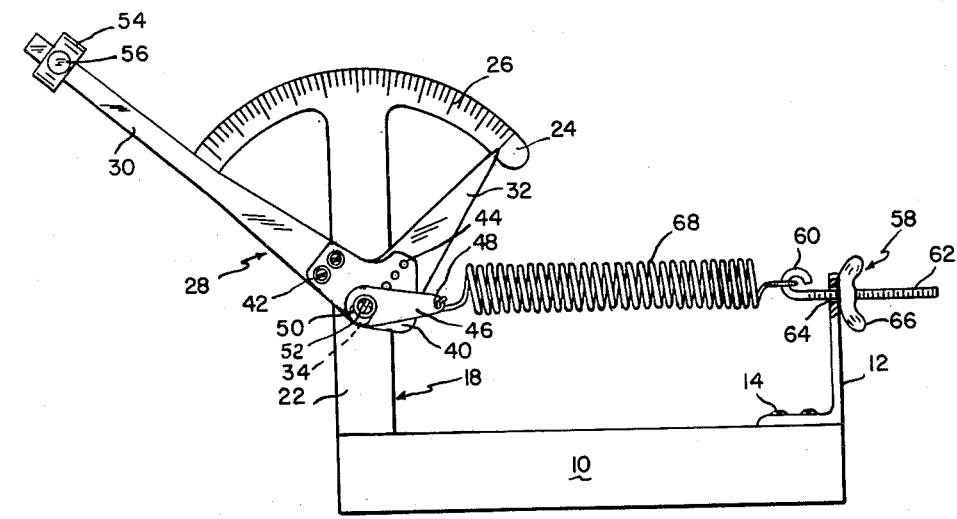
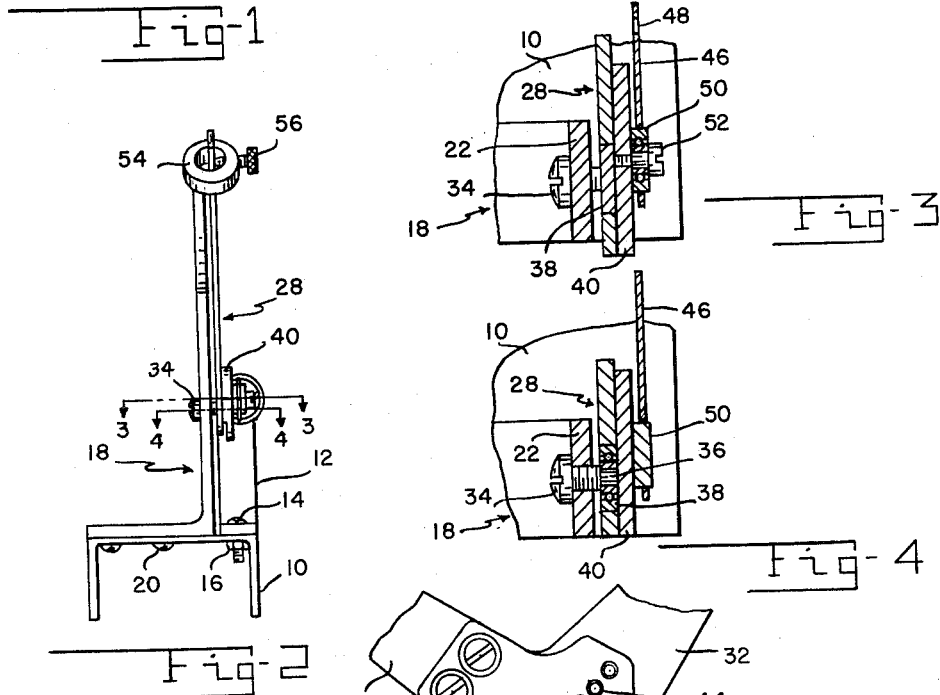
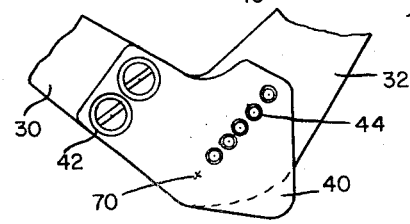
INVENTOR.
CARL W. GERHARDT
BY
ATTORNEYS

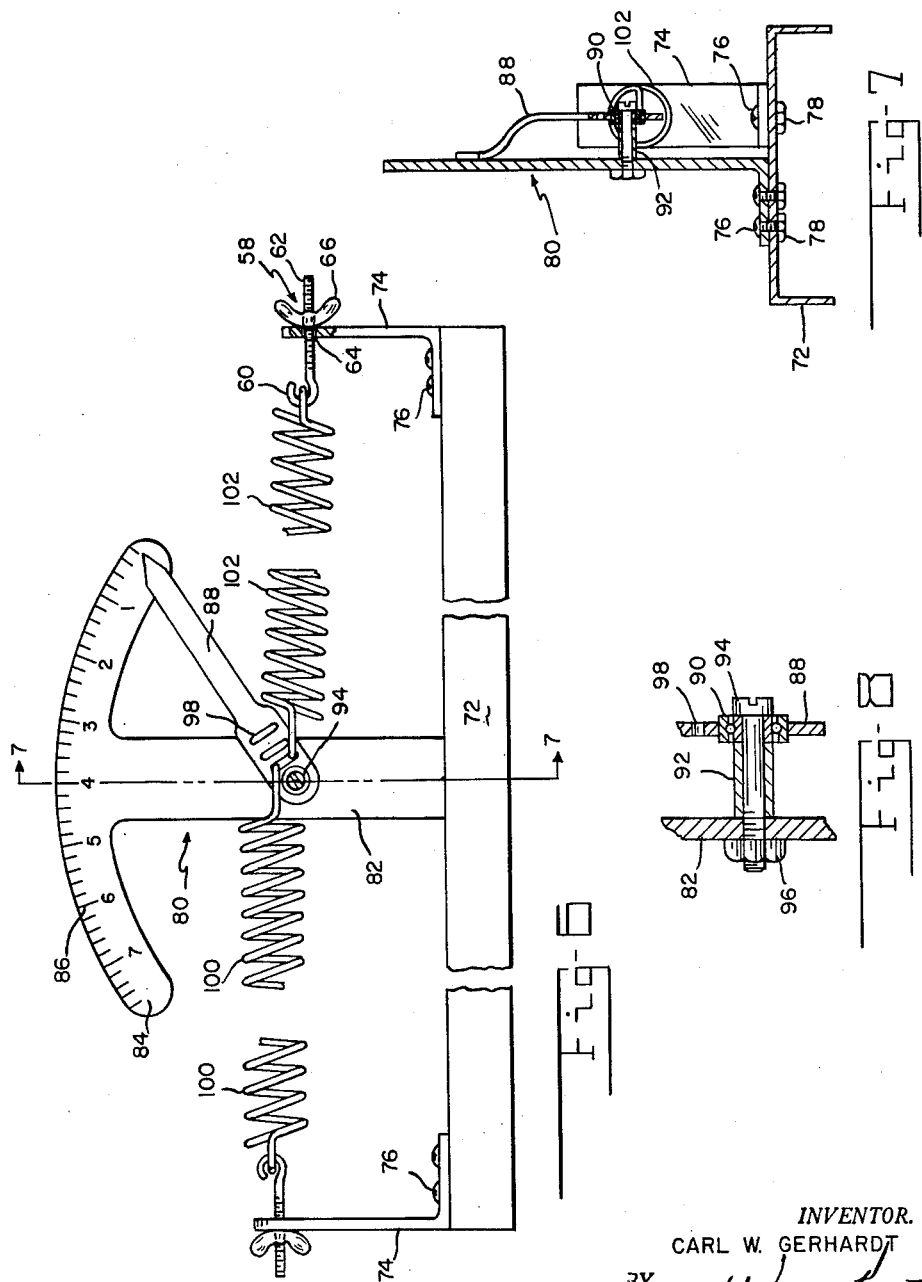

United States Patent Office 3,150,522
Patented Sept. 29, 1964

3,150,522
APPARATUS FOR MEASURING
CORROSION RATES
Carl W. Gerhardt, Dayton, Ohio, assignor to the United States of America as represented by the Secretary of the Air Force
Filed Aug. 29, 1961, Ser. No. 134,787
3 Claims. (Cl. 73—86)
(Granted under Title 35, U. S. Code (1952), sec. 266)

The invention described herein may be manufactured and used by or for the Government for governmental purposes without the payment to me of any royalty thereon.

This invention relates to an apparatus for measuring the corrosivity of an environment or the corrodibility of a resilient member such as a spring when subjected to a corrosive environment.

Prior art relating to the subject of this invention has not adequately provided for amplification of changes wrought in the test specimen during the course of the test. For this reason, and for the fact that apparatus normally used to conduct tests is not expensive precision machinery, it has been found rather difficult to detect and accurately evaluate small increments of change. It has also been found from experience that more reliable and accurate results from corrosion testing may be obtained with apparatus which requires no manipulation and in which the test specimen is not disturbed during the course of the test.

One object of this invention is to provide an improved apparatus for conducting corrosion tests in which the change in the test specimen is amplified or magnified.

Another object of this invention is to provide an apparatus in which the test specimen need not be disturbed during the course of the test.

Still another object of this invention is to provide an apparatus having a scale which may be set on "zero" when the test is initiated.

Yet another object of this invention is to provide an apparatus with increased sensitivity.

Additional objects, advantages and features of the invention reside in the construction, arrangement and combination of parts involved in the embodiments of the invention as will appear from the following description and accompanying drawings, wherein:

FIG. 1 is a front elevation of one embodiment of the invention;

FIG. 2 is a side elevation;

FIG. 3 is a horizontal section along line 3—3 of FIG. 2;

FIG. 4 is a horizontal section along line 4—4 of FIG. 2;

FIG. 5 is an enlarged fragmentary elevation with link removed to show pivot holes;

FIG. 6 is a front elevation of another embodiment of the invention;

FIG. 7 is a sectional elevation along line 7—7 of FIG. 6; and

FIG. 8 is an enlarged section of a portion of FIG. 7 showing construction details of pivot pin and bearing.

Referring to FIG. 1, the preferred embodiment of the invention is made of materials which are noncorrosive in the test environment. As an alternative, if corrosive materials are used, they could be sprayed or otherwise coated with a suitable protective coating. The apparatus has a base 10 of channel form. L-shaped anchor bracket 12 is attached to the top face of the base 10 at one end by means of bolts 14 and nuts 16. An L-shaped quadrant bracket 18 is attached to the top face of base 10 at the opposite end from anchor bracket 12 by means of screws 20. Quadrant bracket 18 has an elongated portion 22 extending upright from the top face of base 10 and terminating in quadrant 24 scribed with a convenient scale 26.

Rotatably mounted to the elongated portion 22 of quadrant bracket 18 is arm 28 which has a weight arm 30 and a pointer 32 substantially at 90° to the weight area. Arm 28 is rotatably mounted to elongated portion 22 by means of screw 34 which is in threaded engagement with elongated portion 22 as best shown by FIG. 4. Screw 34 terminates in shank 36 which is in push fit engagement with bearing 38. The outer race of bearing 38 is in push fit engagement with arm 28.

Pivot block 40 is attached to arm 28 by means of screws 42. Substantially along the centerline of pointer 32 are a plurality of tapped holes 44 in pivot block 40 whose purpose will be explained hereafter.

Link 46 is shaped substantially as shown on FIG. 1 and has a hole 48 at one end and makes push fit engagement with the outer race of bearing 50 at the other end. Link 46 is pivotally mounted on pivot block 40 by means of shouldered screw 52 which makes push fit engagement with the inner race of bearing 50 and threadably engages one of the tapped holes 44 in pivot block 40 as best shown on FIG. 3.

Weight 54 which may be of any convenient shape and weight may be positioned along weight arm 30 and held in place by screw 56.

Anchor 58 has a loop end 60 and a threaded shank 62 which passes through hole 64 of anchor bracket 12. Wing nut 66 engages threaded shank 62 as shown on FIG. 1.

Spring 68 is the test specimen and is made of material corrodible in the test environment to be investigated, or of a material to be investigated in a known corrosive environment.

In operation, the test specimen is placed in the apparatus as shown and subjected to the desired initial stress by adjusting the wing nut on the anchor. Referring to FIG. 5, if arm 28 is pivoted at point 70 for example, it will be noted that weight 54 would tend to produce rotation in a counterclockwise direction. This rotation is resisted by the spring acting over the moment arm between point 70 and the particular tapped hole 44 to which link 46 is attached. It is further noted that initially the apparatus may be balanced to place the pointer on one end of the scale by the selection of a given tapped hole 44, by the stress placed on the spring with the wing nut, and by positioning the weight on the arm. During the course of the test, as the spring progressively loses tensile strength through corrosion of its cross section, the weight will produce counterclockwise movement of the arm until opposing forces are in equilibruim. The amount of counterclockwise rotation is indicated by the position of the pointer on the scale and is an indication of the progressive effect of the corrosive atmosphere on the spring during the then elapsed time of the test.

If desired, the anchor may be omitted and the test specimen spring hooked directly to the anchor bracket. This however is less desirable since the flexibility of the apparatus is decreased.

It will be noted from FIG. 5 that in selecting a proper tapped hole 44, the nearer such hole is to pivot point 70, the shorter will be the moment arm on which the test specimen is acting, and the greater will be the degree of amplification on the scale of the spring elongation resulting from corrosion.

Referring to FIG. 6 another embodiment of the invention has a base 72 of channel form. L-shaped anchor brackets 74 are attached to the top face of base 72 at opposing ends by means of bolts 76 and nuts 78. Midway between anchor brackets 74, quadrant bracket 80 is attached to the top face of base 72 by means of bolts 76 and nuts 78. Quadrant bracket 80 has an elongated portion 82 extending upright from the top face of base 72 and terminating in quadrant 84 scribed with a convenient scale 86.

Rotatably mounted to the elongated portion 82 of quadrant bracket 80 is pointer 88. Referring to FIG. 8, pointer 88 engages with a push fit the outer race of bearing 90. Disposed between elongated portion 82 and pointer 88 is spacer 92. Screw 94 engages the inner race of bearing 90 with a push fit and passes through spacer 92 and elongated portion 82 and is held in place by nut 96. Pointer 88 perpendicular to its axis has a plurality of slots 98. If desired, pairs of small holes close to each other may be substituted for slots 98.

Anchors identical with anchors 58 as shown and described on the prior embodiment of this invention are used on each anchor bracket 74.

Spring 100 is any convenient spring made of material which is noncorrosive in the test environment. Spring 102 is made of corrodible material and is the test specimen to be tested in the corrosive environment.

In operation, springs 100 and 102 are placed in the apparatus as shown and the anchors adjusted to put the pointer on the zero end of the scale.

It is noted that the characteristic movement of the pointer on the scale may be changed by hooking one spring into one slot 98 and the other spring into one of the other slots; also, that the degree of amplification will vary with the moment arm between the pivot and the selected slot.

While several preferred forms of the invention have been shown and described, various modifications and substitution of equivalents will occur to those skilled in the art after a study of the foregoing disclosure. Hence, the disclosure should be taken in an illustrative rather than in a limiting sense; and it is the desire and intention to reserve all modifications within the scope of the subjoined claims.

I claim:

1. A corrosion rate measuring apparatus comprising: a base, a quadrant bracket extending from said base and terminating in a quadrant scribed with a scale, a pointer means pivotally mounted to said quadrant bracket for moving over the scale on said quadrant bracket, a corrodible test specimen spring tensionally disposed between said base and said pointer means and biased to produce rotation of said pointer means about the pivot mount, adjusting means between said base and said test specimen spring for controlling the tension of said test specimen spring, resisting means joined to said pointer means for resisting the rotation of said pointer means produced by said test specimen spring, said resisting means being adjustable to index the position of said pointer means on the scale of said quadrant bracket, said pointer means indicating on the scale of said quadrant bracket the elongation of said test specimen spring due to corrosion of its cross sectional area in a corrosive environment.

2. A corrosion rate measuring apparatus comprising: a base, an anchor bracket extending from said base, a quadrant bracket disposed a convenient distance from said anchor bracket and extending from said base, said quadrant bracket terminating in a quadrant scribed with a scale, a pointer means pivotally mounted to said quadrant bracket, said pointer means at one end moving over the scale on said quadrant bracket and terminating at the other end in a weight arm, a pivot block removably joined to said pointer means, said pivot block having alternate joining positions to establish various length moment arms about the pivot on said pointer means, a corrodible test specimen spring tensionally disposed between said anchor bracket and said pivot block, adjusting means between said anchor bracket and said test specimen spring for controlling the tension of said test specimen spring biased to produce rotation of said pointer means about the pivot mount, a weight slidably adjustable on the weight arm of said pointer means for resisting the rotation of said pointer means produced by said test specimen spring, said pointer means amplifying in predetermined degree as determined by the moment arm established by said pivot block and indicating on the scale of said quadrant bracket the elongation of said test specimen spring due to corrosion of its cross sectional area in a corrosive environment.

3. A corrosion rate measuring apparatus comprising: a base, a first anchor bracket extending from one end of said base, a second anchor bracket extending from the opposite end of said base, a quadrant bracket disposed between said anchor brackets and extending from said base, said quadrant bracket terminating in a quadrant scribed with a scale, a pointer pivotally mounted to said quadrant bracket for moving over the scale on said quadrant bracket, said pointer having a plurality of opening means at spaced distances from the pivot to establish various length moment arms about the pivot, a noncorrodible spring tensionally disposed between said first anchor bracket and one of the opening means in said pointer and biased to produce rotation of said pointer in a first direction, adjusting means between said first anchor bracket and said noncorrodible spring for controlling the tension of said noncorrodible spring, a corrodible test specimen spring tensonally disposed between said second anchor bracket and one of the opening means in said pointer and biased to produce rotation of said pointer about the pivot in a second direction counter to the direction produced by said noncorrodible spring, adjusting means between said second anchor bracket and said corrodible test specimen spring for controlling the tension of said test specimen spring, said pointer amplifying in predetermined degree as determined by the moment arms established by the particular opening means in said pointer engaged by said springs and indicating the elongation of said test specimen spring due to corrosion of its cross sectional area in a corrosive environment.

References Cited in the file of this patent

UNITED STATES PATENTS

| | | |
|---|---|---|
| 1,447,185 | Sammet | Mar. 6, 1923 |
| 1,574,491 | Leake | Feb. 23, 1926 |
| 2,007,880 | Sharp | July 9, 1935 |
| 2,064,198 | Durant | Dec. 15, 1936 |
| 2,113,550 | Nieman | Apr. 5, 1938 |
| 2,186,553 | Linde et al. | Jan. 9, 1940 |
| 2,306,038 | Crew | Dec. 22, 1942 |
| 2,768,068 | Juve et al. | Oct. 23, 1956 |
| 2,972,248 | Gerhardt | Feb. 21, 1961 |
| 2,974,527 | Linthout | Mar. 14, 1961 |